US007505054B2

(12) United States Patent
Thompson

(10) Patent No.: US 7,505,054 B2
(45) Date of Patent: Mar. 17, 2009

(54) DISPLAY RESOLUTION SYSTEMS AND METHODS

(75) Inventor: Robert D. Thompson, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 795 days.

(21) Appl. No.: 10/844,066

(22) Filed: May 12, 2004

(65) Prior Publication Data

US 2005/0253877 A1 Nov. 17, 2005

(51) Int. Cl.
*G09G 5/02* (2006.01)
*H04N 5/225* (2006.01)
*H04N 9/04* (2006.01)

(52) U.S. Cl. .................. 345/698; 345/3.3; 348/207.99; 348/222.1; 348/333.11; 348/333.12

(58) Field of Classification Search ................ 345/589, 345/660, 619, 3.3, 23, 24, 55–100, 204–214, 345/690–699; 348/207.99, 222.1, 333.11, 348/333.12
See application file for complete search history.

(56) References Cited

U.S. PATENT DOCUMENTS 5,912,710 A * 6/1999 Fujimoto .................... 348/445
6,400,371 B1 * 6/2002 Helman et al. .............. 345/589
6,816,613 B2 * 11/2004 Tohyama et al. ............ 382/167
6,972,771 B2 * 12/2005 Nakano et al. .............. 345/589
2002/0024529 A1 2/2002 Miller et al.
2002/0110282 A1 8/2002 Kraft et al.
2002/0186222 A1 12/2002 Morton et al.
2003/0156216 A1 * 8/2003 Nonaka ...................... 348/345
2004/0165086 A1 8/2004 Spitzer et al.

FOREIGN PATENT DOCUMENTS

EP 1475745 A1 11/2004

OTHER PUBLICATIONS

GB Search Report dated Aug. 10, 2005.
HP; News Release, HP Revamps Digital Camera Lineup, Increases Investment to Become a Top Vendor; Photo Marketing Association 2004, Feb. 12, 2004.

* cited by examiner

*Primary Examiner*—David L Lewis

(57) ABSTRACT

Systems and methods for improving resolution in a display are disclosed. One embodiment of the system includes a display and logic configured to change brightness levels of at least one of an image and graphics to improve resolution between the image and the graphics provided in the display.

25 Claims, 12 Drawing Sheets

DISPLAY RESOLUTION SYSTEMS AND METHODS

BACKGROUND

Digital cameras have advanced over the past several years to include a variety of features that may assist the user in improving the quality of the picture taken, as well as to help the user better organize the pictures in photo albums or other media for archiving and/or memorializing various events. One feature in particular includes a display, such as a liquid crystal display (LCD) screen or electronic viewfinder. A user can prompt various modes of operation for the digital camera that, in cooperation with the display, facilitate the process of image capture as well as post-capture operations.

Two modes of operation, or simply modes, include a preview mode and a review mode. In the preview mode, a user can preview an image before "snapping the shot," enabling the user to acquire feedback as to lighting, whether all objects in the image can be captured, and other useful information that helps the user to make the necessary adjustments for taking the optimal snapshot. Additionally, a user can review a captured image (e.g., the photographed image) to determine whether an optimal or desired snapshot actually occurred, thereby facilitating the decision to take another snapshot or not.

In many digital cameras, the display in the preview and review modes comprises graphics which can include such information as the date and time of the snapshot, as well as various options to enable the user to make adjustments for background lighting and other environmental conditions that can affect the quality of the snapshot. However, images are often captured that have a background that renders the graphics difficult to read.

SUMMARY

In one embodiment, a method for improving resolution in a display comprises altering the brightness of a first object to improve resolution between the first object and a second object; and displaying the altered first object and the second object.

In one embodiment, a system for improving resolution in a display comprises a display; and logic configured to change brightness levels of at least one of an image and graphics to improve resolution between the image and the graphics provided in the display.

In one embodiment, a system for improving resolution in a display comprises means for displaying a captured image and graphics; and means for changing the relative brightness between the captured image and the graphics.

In one embodiment, a computer readable medium having a computer program comprising methods for improving resolution in a display comprises logic configured to display a first object and a second object; and logic configured to alter the brightness of the first object to improve resolution between the first object and the second object.

BRIEF DESCRIPTION OF THE DRAWINGS

The components in the drawings are not necessarily to scale, emphasis instead being placed upon clearly illustrating the principles of the disclosed systems and methods. Moreover, in the drawings, like reference numerals designate corresponding parts throughout the several views.

DETAILED DESCRIPTION

Disclosed herein are various embodiments of a display resolution system and method, or for brevity, a display resolution system. The display resolution system may include functionality that improves the readability of graphics on displays such as a liquid crystal display (LCD) screens, microdisplays (e.g., electronic viewfinder), and other displays. The graphics typically provide information to the user in the form of text, symbols, and/or menus. When graphics are overlaid on a captured image (e.g., text on a photographed image) that has the same or similar color to the graphics, the graphics tend to "disappear" into or blend with the captured image, making it difficult to see the graphics. The display resolution system changes the brightness of the graphics, the captured image, or both, to provide further contrast between the graphics and the captured image without consuming excessive display "real estate" and without significantly interfering with the captured image. In other words, it is a relative difference in brightness between a captured image and graphics that the display resolution seeks to achieve to improve the overall resolution between the image and the graphics.

"Brightness" as used herein refers to a location of a visual perception along a black and white continuum. For example, brightness may be a term used to describe the actual and/or perceived quantity of light emitted or appearing to be emitted from objects in a display.

"Resolution" and "contrast" are used interchangeably in this disclosure, and refer to the process or capability of making distinguishable the individual parts of an object, closely adjacent optical images, or sources of light, as well as the end state of such a process.

Although display resolution systems are described below in the context of digital cameras, other image capture devices such as video cameras can benefit from the disclosed display resolution systems.

Figure 1:
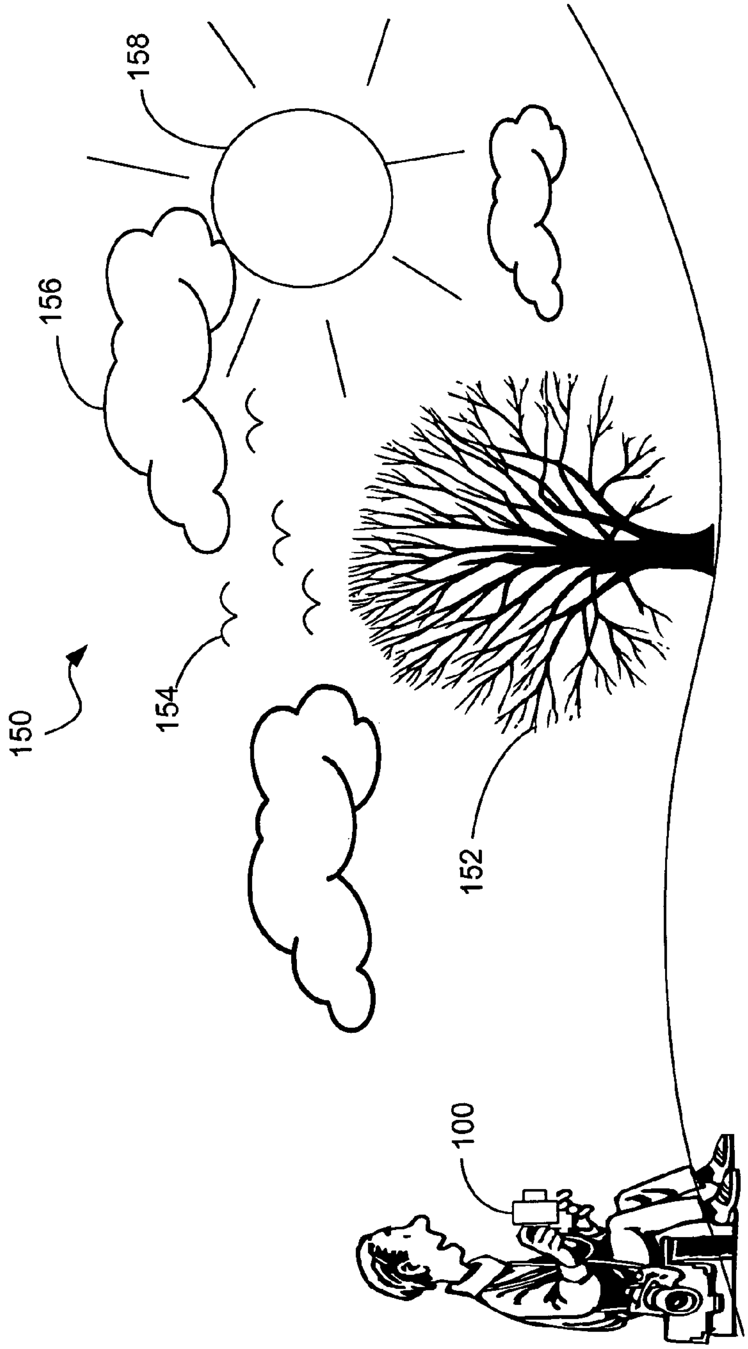
FIG. 1 is a schematic diagram of an example implementation for a digital camera in which various embodiments of a display resolution system can be implemented.
Figure 2A:
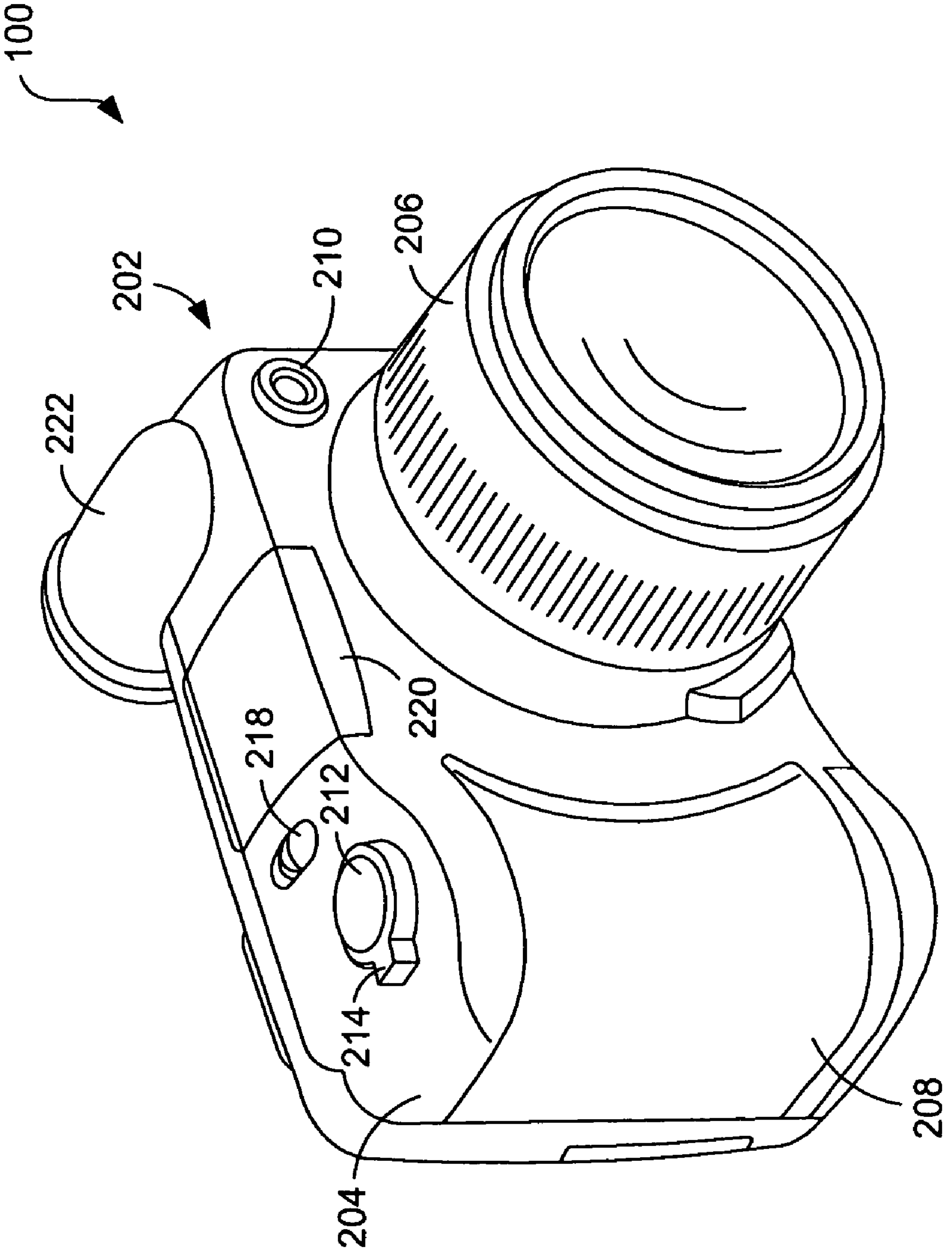
FIGS. 2A and 2B are schematic diagrams of the example digital camera of FIG. 1.
Figure 2B:
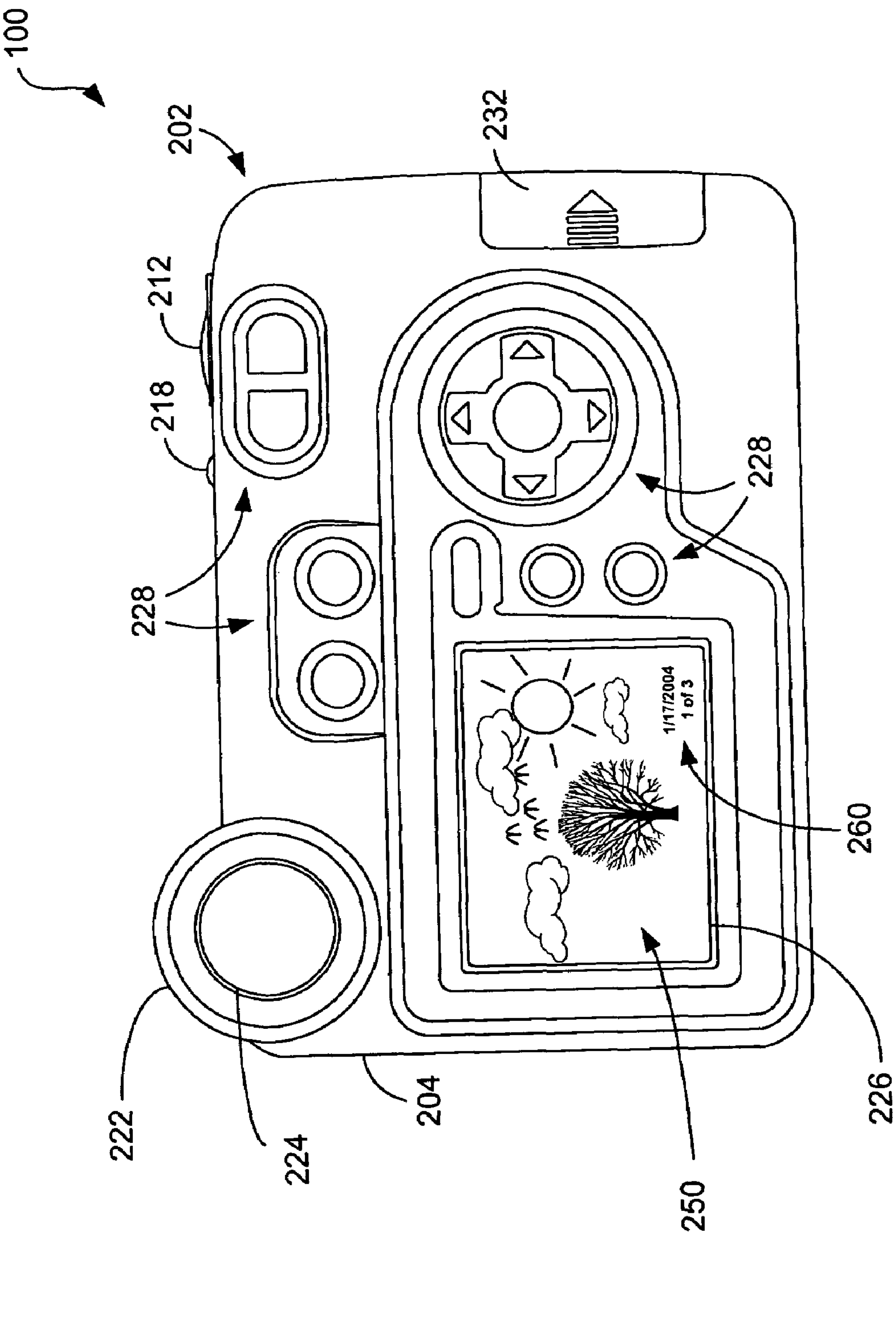
Figure 2C:
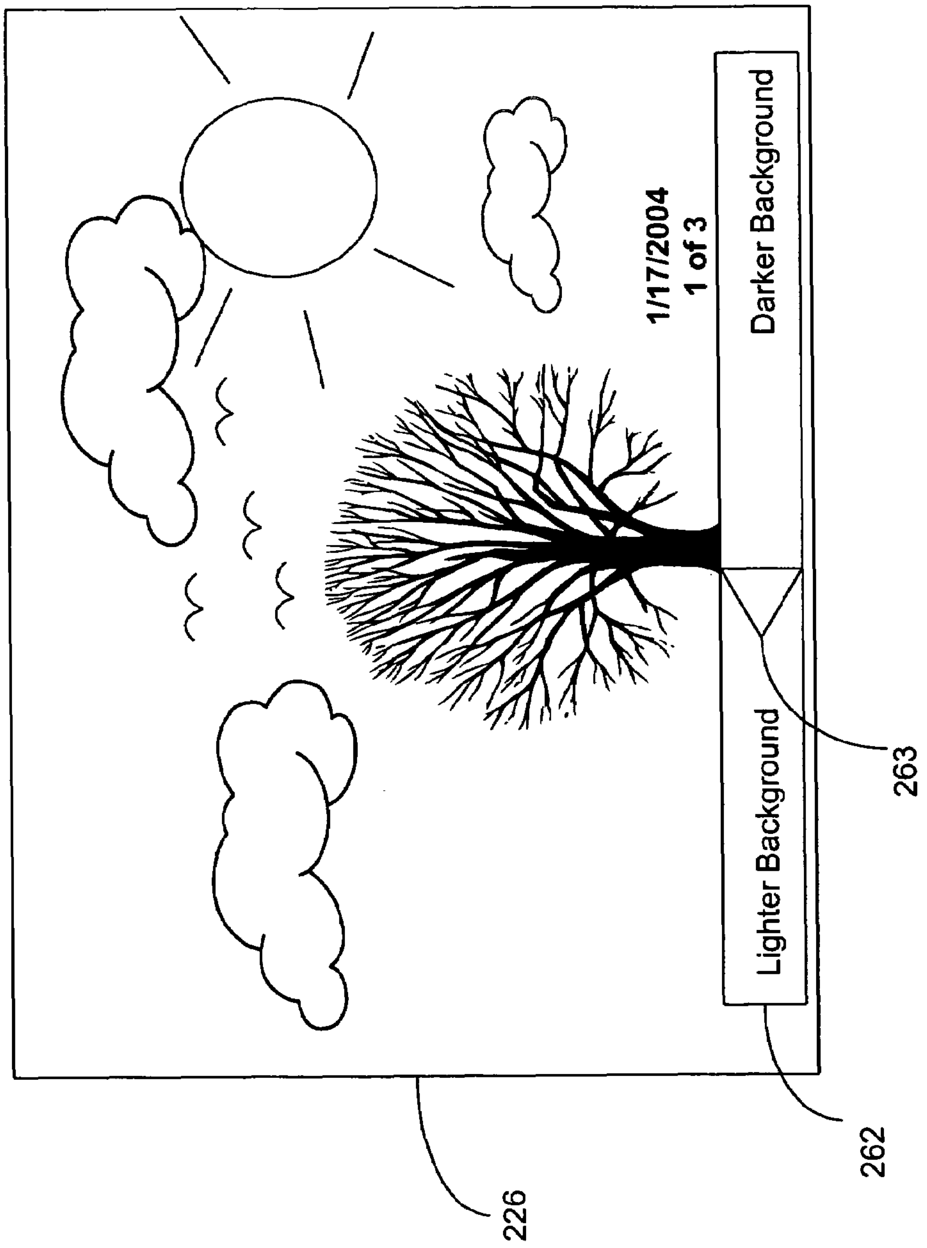
FIG. 2C is a schematic diagram of the example display shown in FIG. 2B with an embodiment of a graphics overlay of the display resolution system that enables user-configurable adjustment of the resolution.
Figure 3:
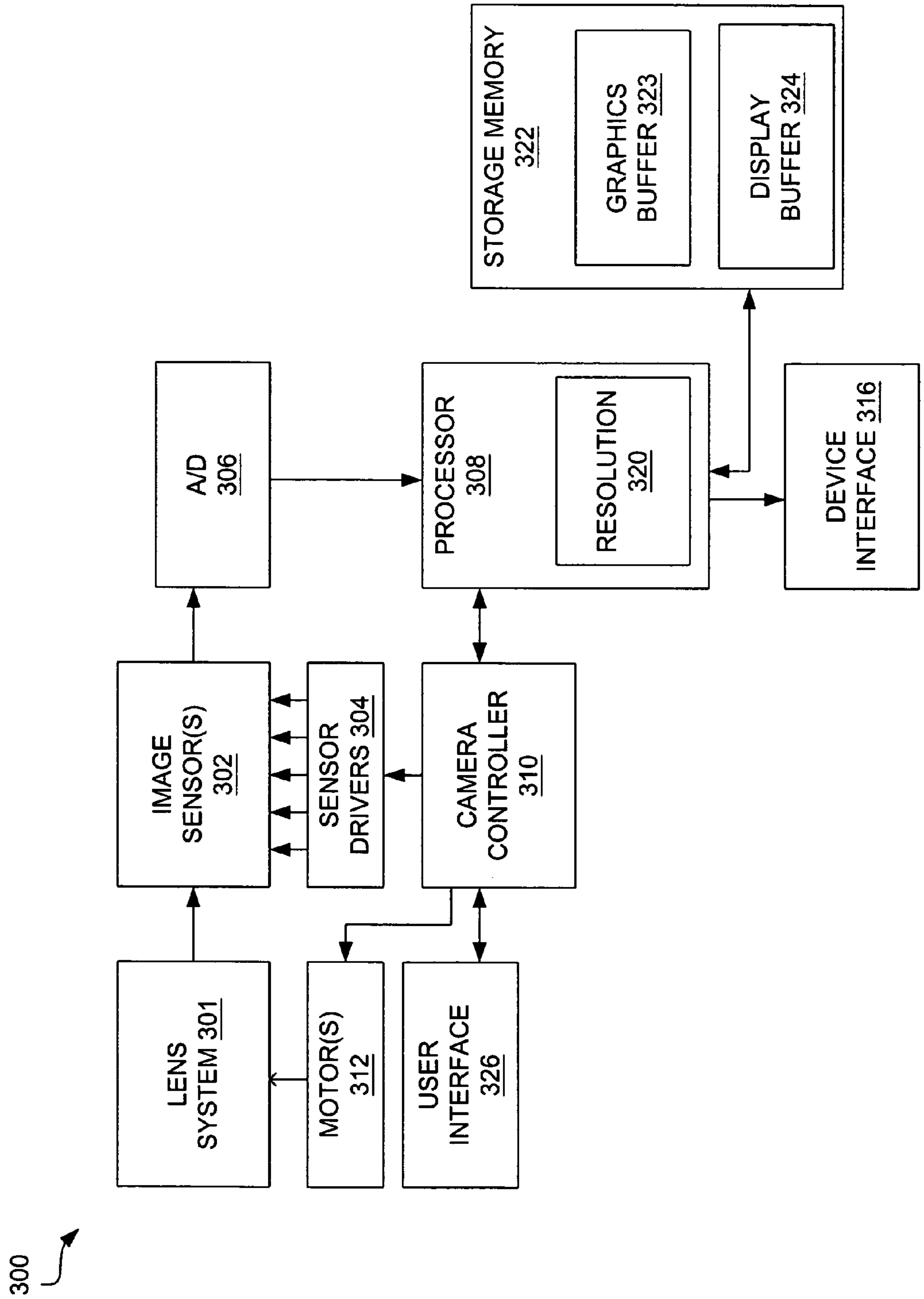
FIG. 3 illustrates an embodiment of a display resolution system of the digital camera shown in FIGS. 2A and 2B.
Figure 4:
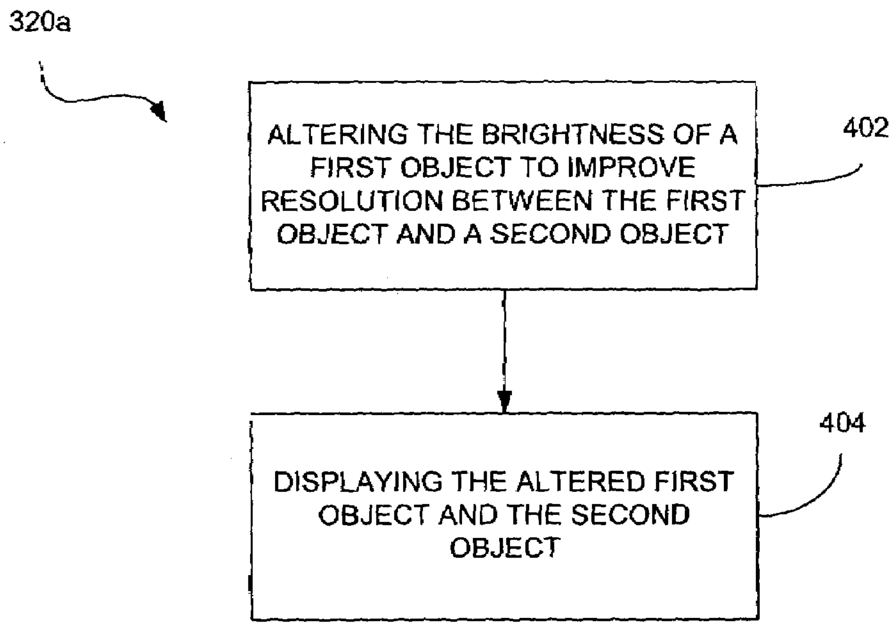
FIG. 4 is a flow diagram that illustrates a generalized method embodiment employed by the display resolution system of FIG. 3 to improve resolution in a display.

In the description that follows, an example implementation for a digital camera using a display resolution system is described in FIG. 1. Front and rear schematic views of a digital camera are shown in FIGS. 2A-2B. FIG. 2C is an example display of a display resolution system that illustrates a captured image with overlaid graphics. FIG. 3 is used to illustrate an embodiment of a display resolution system. Various embodiments of a display resolution method are described in FIGS. 4-10.

FIG. 1 is a schematic diagram of an example implementation for a digital camera in which various embodiments of a display resolution system can be implemented. As shown, a user is perched on a bench holding a digital camera 100. In the example shown in FIG. 1, the user is taking a camera snapshot of an outdoor scene 150. The outdoor scene 150 includes a tree 152, birds 154, clouds 156, and the sun 158. The user may preview the scene 150 using a display (not shown) before taking the snapshot to ensure all of the objects of interest will be captured. In addition, the user can review the captured image (e.g., the photographed scene 150) in the display to confirm the capture occurred as desired and/or to take other actions.

FIGS. 2A and 2B are schematic diagrams of the example digital camera 100 of FIG. 1. As indicated in FIG. 2A, the digital camera 100 includes a body 202 that is encapsulated by an outer housing 204. The digital camera 100 further includes a lens barrel 206 that, by way of example, houses a zoom lens system. Incorporated into the front portion of the camera body 202 is a grip 208 that is used to grasp the camera 100 and a focus assist light-emitting diode (LED) 210 that, for example, can be used to cast a light on a target to assist the camera in focusing in low light conditions.

The top portion of the digital camera 100 is provided with a shutter-release button 212 that is used to open the camera shutter (not visible in FIG. 2A). Surrounding the shutter-release button 212 is a ring control 214 that is used to zoom the lens system in and out depending upon the direction in which the control is urged. Adjacent the shutter-release button 212 is a switch 218 that is used to control operation of a pop-up flash 220 (shown in the retracted position) that can be used to illuminate objects in low light conditions.

Referring now to FIG. 2B, which shows the rear of the digital camera 100, further provided on the camera body 202 is a display 226. The display 226 provides an area where captured images and GUIs (graphical user interfaces) are presented to the user, and is typically used to compose shots (e.g., using a preview mode) and review captured images (e.g., using a review mode). Shown in the display 226 is the captured image 250 corresponding to the outdoor scene 150 of FIG. 1 as it may appear in a "review" mode. Graphics 260 are overlaid on the captured image 250 and, in this example, comprise the current date and number of captured images currently stored on the digital camera 100. By way of example, the display 226 can comprise a liquid crystal display (LCD) screen. The captured image 250 may comprise a color or shading that blends with the graphics 260. For example, assuming white text (not shown) for the graphics 260, if the white text was positioned over the white clouds shown in the captured image 250, the white text may be difficult to read. The resolution display system overcomes this potential problem by changing the brightness of the captured image and/or the graphics, as described below.

Optionally, the back panel of the digital camera 100 may also include an electronic viewfinder (EVF) 222 that incorporates a microdisplay (not visible in FIG. 2A or 2B) upon which captured images and GUIs can be presented to the user and that may similarly benefit from the display resolution system. The microdisplay may be viewed by looking through a view window 224 of the viewfinder 222. The back panel of the camera body 202 further includes a compartment 232 that is used to house a battery and/or a memory card. Various control buttons 228 are also provided on the back panel of the digital camera body 202. These buttons 228 can be used, for instance, to scroll through captured images shown in the display 226, to prompt various edit screen functions and preview and review modes, and to change brightness.

For instance, with reference to FIG. 2C, a graphical sliding scale bar 262 can be prompted (or automatically appear in response to a viewing mode change) on the display 226. The sliding scale bar 262 may include an arrow icon 263 that can be positioned through the manipulation of the control buttons 228 to change the brightness of either the captured image or graphics, or both.

FIG. 3 depicts an embodiment of a display resolution system 300 for the digital camera 100 (FIG. 2A). As indicated in this figure, the display resolution system 300 can include a lens system 301 that conveys images of viewed scenes to one or more image sensors 302. By way of example, the image sensors 302 comprise charge-coupled devices (CCDs) or complementary metal-oxide semiconductor (CMOS) sensors that are driven by one or more sensor drivers 304. The analog image signals captured by the sensors 302 are then provided to an analog-to-digital (A/D) converter 306 for conversion into binary code that can be processed by a processor 308.

Operation of the sensor drivers 304 is controlled through a camera controller 310 that is in bidirectional communication with the processor 308. Also controlled through the controller 310 are one or more motors 312 that are used to drive the lens system 301 (e.g., to adjust focus and zoom). Operation of the camera controller 310 may be adjusted through manipulation of the user interface 326. The user interface 326 comprises the various components used to view images and to enter selections and commands into the digital camera 100 and therefore at least includes the display 226, shutter-release button 212, the ring control 214, and the control buttons 228 identified in FIGS. 2A and 2B.

The digital image signals are processed in accordance with instructions from the camera controller 310 and the processor 308 in cooperation with storage memory 322. The processor 308 includes, in one embodiment, a resolution module 320 that includes embedded instructions for the processor 308 to alter the brightness of the captured image 250 (FIG. 2B), the graphics 260 (FIG. 2B, including graphics bar 262 and icon 263 in FIG. 2C), or a combination of the same. In some embodiments, functionality of the resolution module 320 may reside in other components, including the storage memory 322 or the camera controller 310. The storage memory 322 can include volatile and non-volatile memory, and in one embodiment includes a graphics buffer 323 and a display buffer 324. The processor 308 combines pixel data corresponding to the captured image 250 from the display buffer 324 with graphics data from the graphics buffer 323. In cooperation with the camera controller 310 and the processor 308, the user interface 326 causes the display of the captured image 250 and graphics 260. The brightness of the captured image 250 and/or the graphics 260 may be changed by the processor 308 implementing code in the resolution module 320, depending on the manufacturer default settings or configurations established by the user. Processed images may then be stored in internal FLASH memory (not shown) or on a removable memory medium (not shown).

The display resolution system 300 further comprises a device interface 316, such as a universal serial bus (USB) connector, that is used to download images from the digital camera 100 (FIG. 2A) to another device such as a personal computer (PC) or a printer, and which can be likewise used to upload images or other information.

The resolution module 320 can be implemented in hardware, software, firmware, or a combination thereof. When implemented in hardware or firmware, the resolution module 320 can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

When the resolution module 320 is implemented in software, the resolution module 320 can be stored on any computer-readable medium for use by or in connection with any computer-related system or method. In the context of this document, a computer-readable medium is an electronic, magnetic, optical, or other physical device or means that can contain or store a computer program for use by or in connection with a computer-related system or method. The resolution module 320 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

FIGS. 4-10 are flow diagrams that illustrate various embodiments of the resolution module methods 320 employed by the display resolution system 300 shown in FIG. 3. Referring to the generalized method embodiment 320*a* shown in FIG. 4, step 402 includes altering the brightness of a first object to improve the resolution between the first object and a second object. The first object and the second object may be one or more elements of a captured image or one or more elements of the graphics overlaid on the captured image. For example, if the first object corresponds to an object or element of a captured image, the alteration can include reducing the brightness of each pixel in a display, providing a dimming effect. Another mechanism can include applying a different gamma curve to the captured image data. If the first object is the graphics, the alteration may include altering the brightness of the graphics by changing the transparency of the graphics. In other words, the graphics overlay may be made less transparent, creating a perception that the underlying captured image is dimmer. Step 404 includes displaying the altered first object and the second object. The difference in brightness will provide greater contrast between both objects, enabling, for example, the user to read the text in the display. Note that no underlying assumptions are made about the color of the graphics, since it is an increase in the relative difference in brightness between the image and graphics that the display resolution system 300 seeks to achieve.

In some embodiments, the graphics can be combined in one layer (e.g., not "overlaid"). For example, the brightness of the captured image can be reduced and the graphics can then be rendered into the same layer as the altered captured image. If the graphics are to be rendered in the same plane as the captured image, this can be accomplished according to several methods. One method is to render the captured image into a display buffer and in that same physical memory place the appropriate graphics data where needed by replacing the captured image data with the graphics data. Another method includes rendering the captured image and graphics in separate buffers and perform a logical "OR" operation to the two buffers. The resultant output is placed into the display buffer.

Figure 5:
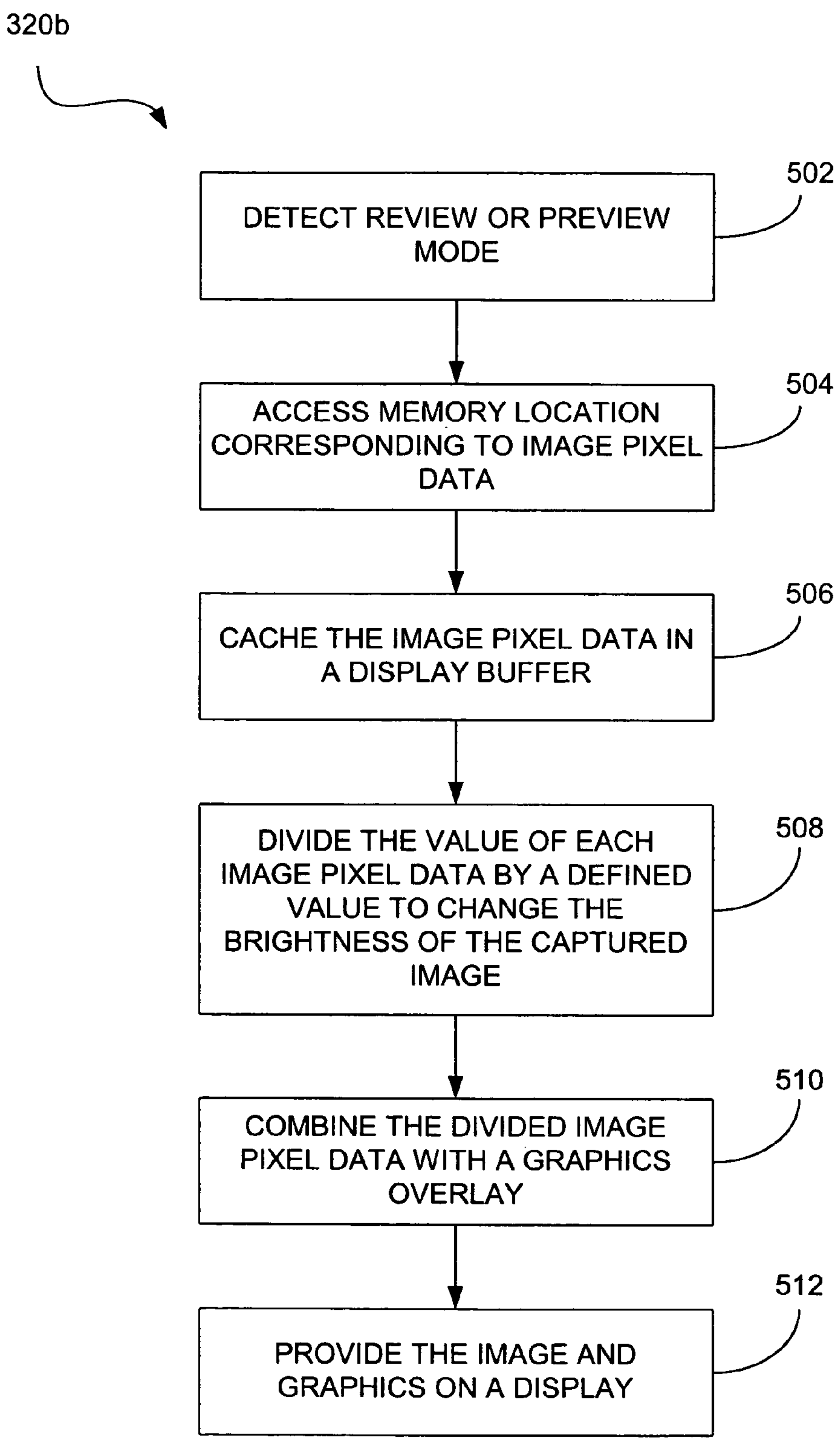
FIG. 5 is a flow diagram that illustrates a method embodiment employed by the display resolution system of FIG. 3 to improve resolution by providing an automatic change in brightness of the captured image using a fixed multiplier for each pixel.
Figure 6:
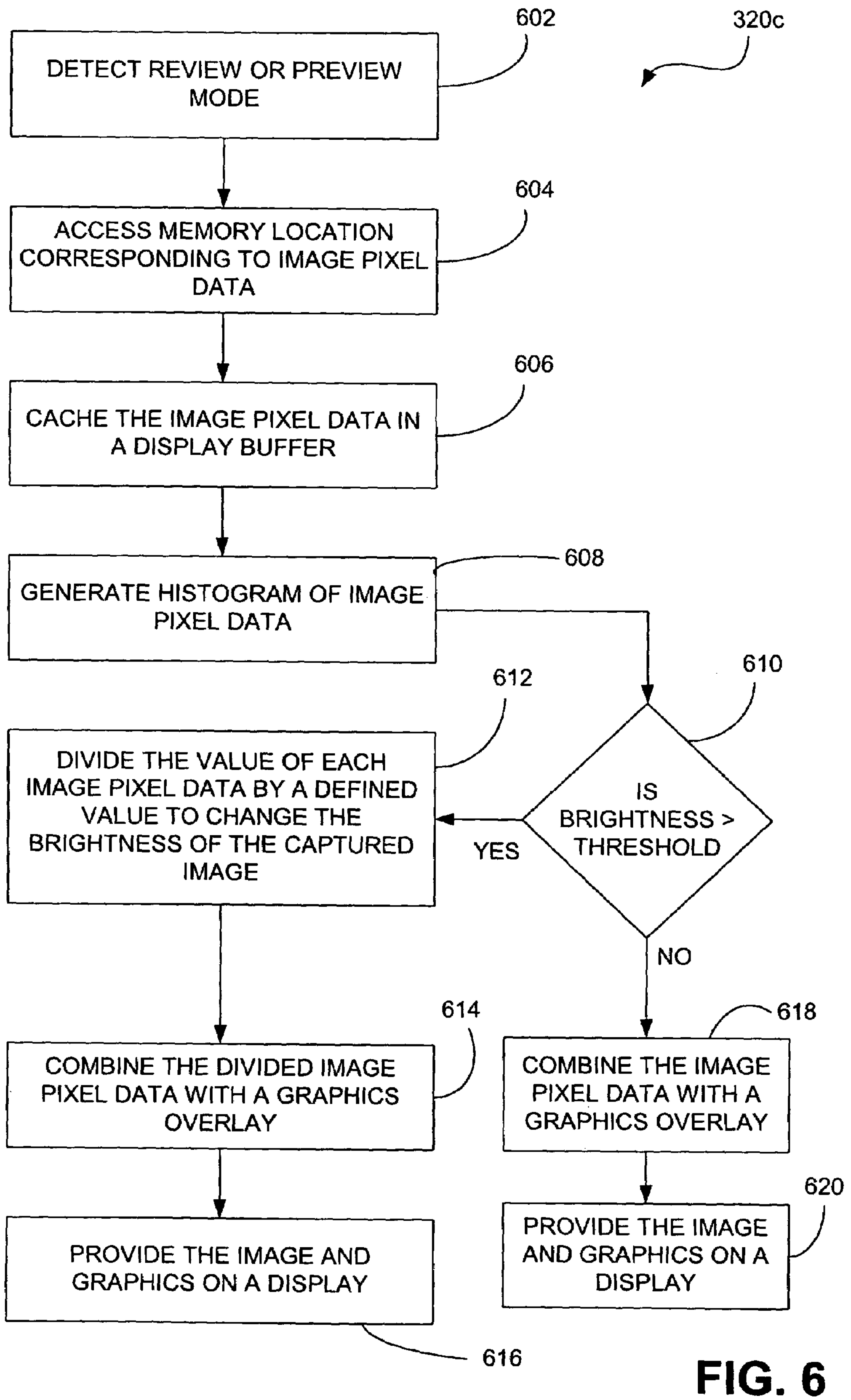
FIG. 6 is a flow diagram that illustrates a method embodiment employed by the display resolution system of FIG. 3 to improve resolution by providing an automatic brightness change to the captured image based on an internally generated histogram.
Figure 7:
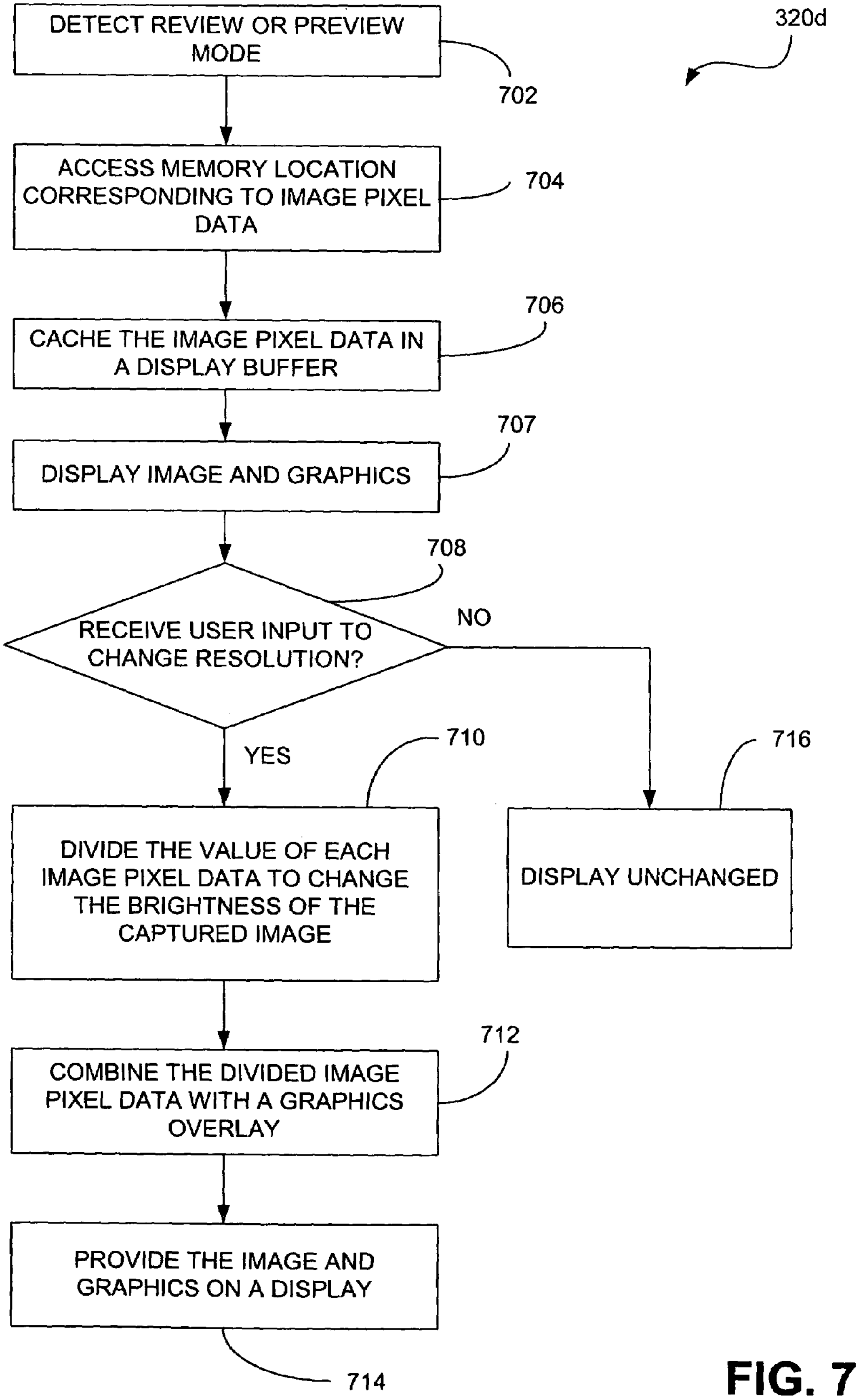
FIG. 7 is a flow diagram that illustrates a method embodiment employed by the display resolution system of FIG. 3 to improve resolution by enabling a user-prompted brightness alteration using a fixed multiplier or configurable multiplier applied to each image pixel value.
Figure 8:
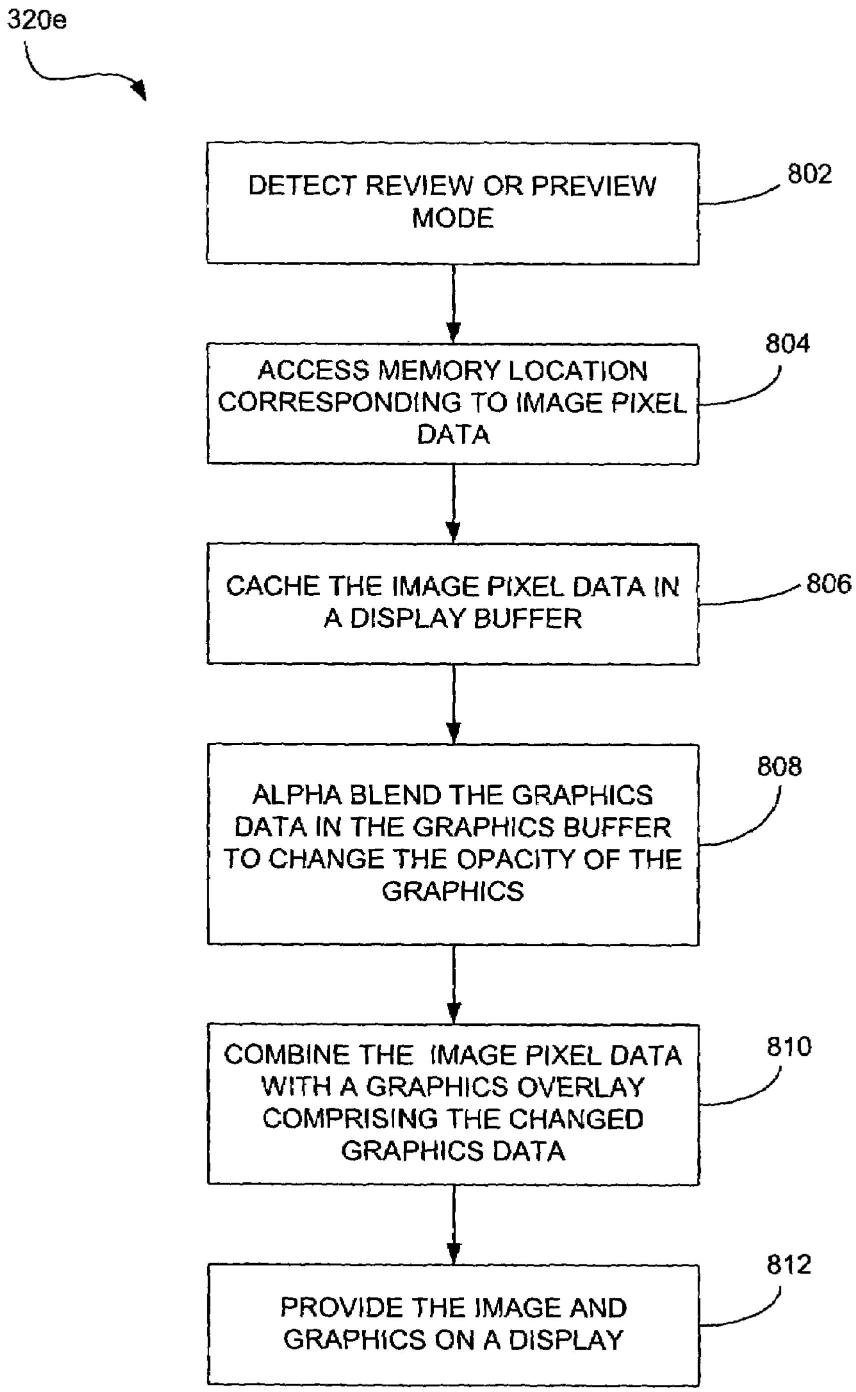
FIG. 8 is a flow diagram that illustrates a method embodiment employed by the display resolution system of FIG. 3 to improve resolution by providing an automatic brightness change by a fixed alpha blending that changes the opacity of the graphics.
Figure 9:
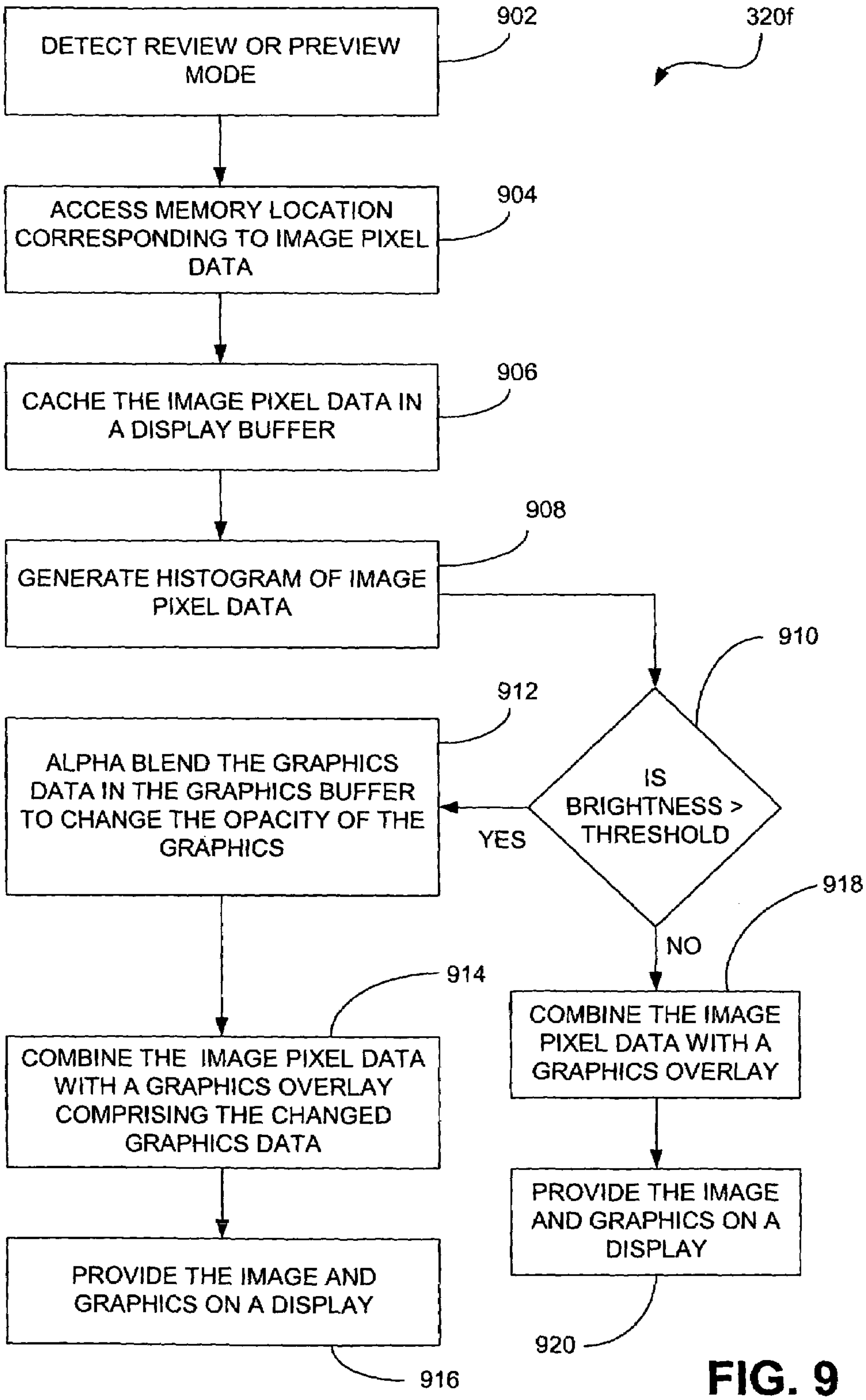
FIG. 9 is a flow diagram that illustrates a method embodiment employed by the display resolution system of FIG. 3 to improve resolution by providing an automatic brightness change to the graphics based on an internally generated histogram.
Figure 10:
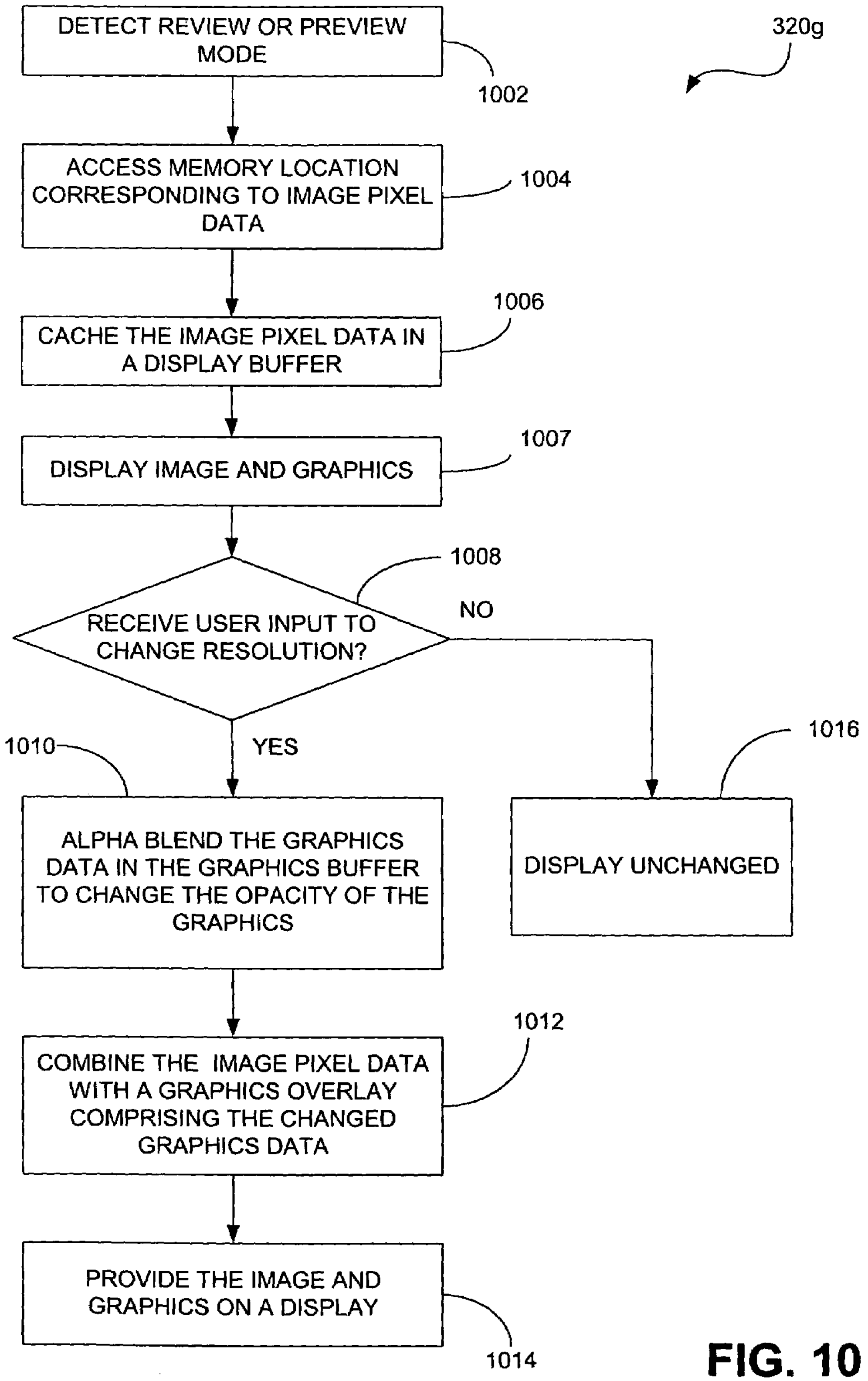
FIG. 10 is a flow diagram that illustrates a method embodiment employed by the display resolution system of FIG. 3 to improve resolution by enabling a user-prompted brightness alteration using a fixed multiplier or configurable multiplier applied to each value for each image pixel data.

FIGS. 5-7 illustrate method embodiments of the resolution module 320 (FIG. 3) that provide brightness alteration by action on the image pixel data of the captured image. FIGS. 8-10 illustrate method embodiments of the resolution module 320 that provide brightness alteration by processing of the graphics data. It will be understood that various combinations of these methods can be applied to improve the resolution between the graphics and the captured image. The resolution method embodiment 320*b* illustrated in FIG. 5 provides for an automatic change in brightness of the captured image using a fixed multiplier for each pixel. Step 502 includes detecting the review or preview mode of the digital camera 100 (FIGS. 2A-2B). In step 502 (and like steps in FIGS. 6-10), operation in one embodiment does not proceed until one of these modes is detected. The user can prompt either mode by selecting one of the various control buttons 228 of the digital camera 100. In some embodiments, such a mode may be activated automatically after a predetermined lapse of time upon taking a snapshot of the image. The preview mode is generally understood as the mode activated prior to taking a shot of a particular screen, wherein the user can view the scene through a display (e.g., display 226 of FIG. 2B). The review mode is generally understood as the mode activated to review the captured image 250 (e.g., through observing the captured image in the display 226).

Step 504 includes accessing the memory location or locations corresponding to image pixel data, and step 506 includes caching in the display buffer (e.g., display buffer 324, FIG. 3A) the image pixel data. In one embodiment, the processor 308 accesses (e.g., through a fetch routine or direct memory access) registers in storage memory 322 to retrieve image pixel data corresponding to the captured image. The processor 308 caches the image pixel data in the display buffer 324. Step 508 includes dividing (or the effective equivalent, such as multiplying) the value of each image pixel data by a fixed value to change the brightness of the captured image. For example, the fixed value can be a default value that is a percentage of the original image pixel data value or values as selected by the manufacturer, or alternatively, a value as configured by a user through a system start-up user interface or menu item. Additionally, the fixed value can be an integer or fractional value to enable a "dimming" effect or to increase brightness. For example, the graphics may comprise white-colored text. Dimming the image pixel data would thus involve dividing by an integer value to reduce the brightness level to provide greater contrast between the white text and the now-darker captured image.

Step 510 includes combining the divided image pixel data with a graphics overlay provided via the graphics buffer 323. Step 512 includes providing the captured image and the overlaid graphics on a display, such as display 226 (FIG. 2B).

FIG. 6 is a flow diagram of an embodiment of a resolution method 320*c* that provides for an automatic brightness change to the captured image based on an internally generated histogram. A "histogram" is a representation of a frequency distribution of image pixel values with each frequency represented using, for example, rectangles whose widths represent class intervals and whose areas are proportional to the corresponding frequencies. Steps 602 through 606 are similar to steps 502-506, and thus discussion of the same is omitted. Step 608 includes generating a histogram of the image pixel data. The histogram can be generated over the entire image or over a smaller sub-image that is "behind" the overlaid graphics. Furthermore, a histogram can be generated covering a sub-sampled version of the main image or a filtered version of the main image. The filter can remove features of the image that may adversely affect the histogram values. The histogram can provide a measure of the brightness of the image pixel data. In step 610, a determination is made as to whether the brightness level evaluated in the histogram is greater than a defined threshold. The threshold may be a default value as provided by the manufacturer, or can be a value that is configurable by the user in a set-up user interface or other mechanisms for receiving user settings. If the brightness level is greater than a defined threshold, the image pixel values are divided by a fixed or configurable value, either across the entire image or a portion of the image (e.g., where graphics are overlaid) (step 612). Processing continues in steps 614 and 616 in a similar manner as described for like-steps in FIG. 5. If the brightness is equal to or below a defined threshold, the brightness of the captured image is left unchanged, and the image pixel data is combined with a graphics overlay (step 618) for presentation on a display (step 620).

FIG. 7 is a flow diagram of an embodiment of a resolution method 320*d* that provides for user-prompted brightness alteration using a fixed multiplier or configurable multiplier applied to each image pixel value. Steps 702-706 are similar to like-steps in the prior figures, and thus the explanation of these steps are omitted. Step 707 includes displaying the captured image with a graphics overlay in the display. Step 708 includes receiving user input to change the resolution of the display. In one embodiment, instructions in the graphics overlay can offer a user the option of changing the brightness level of the captured image. The instructions can be invoked automatically, or responsive to selecting the control button 228. A cursor may be presented that the user can navigate to the desired selection option with the control buttons 228 (e.g., arrow keys to position a cursor along the bar), an example of which is shown in FIG. 2C.

Responsive to selecting a displayed option, a fixed-value division of each pixel value of the image pixel data can be implemented, or a user-configurable multiplier can be implemented (step 710). For an example of the latter, a sliding scale bar (e.g., sliding scale bar 262 of FIG. 2C) can be provided as part of the graphics, either automatically, or responsive to a "change-brightness" option (not shown) provided in the graphics overlay. The user can navigate a cursor (e.g., arrow 263 of FIG. 2C) provided as part of the graphics overlay. Per each incremental change in brightness, a revised display of the captured image and graphics can be displayed that offers the user feedback as to the desired brightness level. In some embodiments, the digital camera 100 may comprise a dedicated "brightness" button (not shown) that the user can select to dim a captured image upon its presentation during a review mode or dim a previewed image during the preview mode. Alternatively, the existing control buttons 228 (FIG. 2B) may be implemented as a brightness button as suggested by instructions or selectable icons in the graphics overlay.

Processing can continue per steps 712 and 714 in a manner as similarly described above in FIGS. 5 and 6.

If no user input has been received in step 708, then the display remains unchanged (step 716).

FIG. 8 is a flow diagram that illustrates an embodiment of a resolution method 320*e* that provides for an automatic brightness change by a fixed alpha blending that changes the opacity of the graphics. Steps 802-806 are similar to like steps in FIGS. 5-7 and thus the discussion of the same is omitted. Step 808 includes alpha blending the graphics data in the graphics buffer (e.g., graphics buffer 323, FIG. 3) to change the opacity of the graphics. Alpha blending creates the effect of transparency, using four channels to define color (three for the primaries red, green, and blue, and the fourth, referred to as the alpha channel, to provide information about image or graphics transparency). The alpha channel includes weighting factors ranging between 0 (foreground completely transparent) to 1 (foreground is completely opaque and obscures the background). Weighting factors in between 0 and 1 provide a mixture of the two graphics objects (or images and graphics). The alpha channel thus specifies via the weighting factors how foreground colors should be merged (e.g., overlaid) with colors in the background. One mechanism for creating such an effect is to combine a translucent foreground with a background color to create an in-between blend. The determination of the alpha level is determined similarly to that described for the pixel data multiplier (or divider) described above. Step 810 includes combining the image pixel data with a graphics overlay comprising the changed graphics data (e.g., alpha-blended data). Step 812 includes providing the captured image and graphics on a display.

FIG. 9 is a flow diagram of an embodiment of a resolution method 320*f* that provides for an automatic brightness change to the graphics based on an internally-generated histogram. Steps 902-906 are similar to like steps in FIG. 8, and thus the discussion of the same are omitted. Step 908 includes generating a histogram of the image pixel data, and step 910 includes determining whether the brightness level is greater than a defined threshold, similar to the operation described for like-steps in FIG. 6. Step 912 includes alpha-blending the graphics data in the graphics buffer (e.g., graphics buffer 323, FIG. 3) to change the opacity of the graphics such that the graphics is readable over the captured image. Processing continues with steps 914 and 916 in a manner as similarly described in FIG. 8. If the image pixel data brightness is less than or equal to a defined threshold brightness, then the image pixel data is combined with the graphics (step 918) and provided on a display (step 920) without altering the brightness values.

FIG. 10 is a flow diagram of an embodiment of a resolution method 320*g* that provides for user-prompted brightness alteration using a fixed multiplier or configurable multiplier applied to each value for each image pixel data. Steps 1002-1008 are similar to like-numbered steps shown in FIG. 7, and thus the discussion of the same are omitted. Step 1010 includes alpha blending the graphics data in the graphics buffer (e.g., graphics buffer 323, FIG. 3) to change the opacity of the graphics responsive to user input to change the resolution. As described with regards to FIG. 7, user input can be realized via a dedicated "dim" or "brightness" button selection, or via existing buttons alone or in cooperation with instructions or symbols in the graphics overlay. Step 1012 includes combining the image pixel data with a graphics overlay comprising the changed graphics data. The remaining steps 1014-1016 are similar to those described above and the discussion of the same are omitted.

Any process descriptions or blocks in flow charts should be understood as representing portions of code which include one or more executable instructions for implementing specific logical functions or steps in the process. Alternative implementations are included within the scope of the disclosure and functions may be executed out of order from that shown or discussed, including substantially concurrently or in reverse order, depending on the functionality involved, as would be understood by those reasonably skilled in the art.

What is claimed is:

1. A method for improving resolution in a display, said method comprising:

altering the brightness of an image to improve resolution between the image and a graphics overlay; and displaying the graphics overlay on the altered image;

wherein altering the brightness includes applying a predetermined gamma curve to image data of the image while maintaining a substantially constant opacity for the graphics overlay.

2. The method of claim 1, wherein displaying the graphics overlay on the altered image includes overlaying the graphics overlay on the altered image.

3. The method of claim 1, wherein altering the brightness includes adjusting pixel brightness values corresponding to the first object while maintaining a substantially constant opacity for the graphics overlay.

4. The method of claim 1, wherein altering the brightness includes applying a predetermined gamma curve to image data of the image while maintaining a substantially constant opacity for the graphics overlay.

5. The method of claim 1, wherein altering is responsive to at least one of user input and default settings.

6. The method of claim 1, further including determining the brightness of at least one of the image and the graphics overlay.

7. A method for improving resolution in a display, said method comprising:

determining the brightness of at least one of the image and the graphics overlay altering the brightness of an image to improve resolution between the image and a graphics overlay; and displaying the graphics overlay on the altered image;

wherein determining the brightness includes generating a histogram and evaluating brightness values.

8. The method of claim 1, further including comparing the brightness of the image with a defined threshold value of brightness.

9. The method of claim 1 further including altering the brightness of the graphics overlay.

10. A system for improving resolution in a display, said system comprising:

a display; and logic configured to reduce brightness levels of an image to improve resolution between the image and graphics overlaid on the image in the display;

wherein the logic is configured to generate a histogram of the image and change the brightness based on an actual pixel brightness value determined from the histogram when compared to a threshold pixel brightness value.

11. The system of claim 10, wherein the logic is configured to overlay the graphics on the image by rendering the graphics directly on the image.

12. The system of claim 10, wherein the logic is configured to overlay the graphics on the image by rendering the graphics on a first display plane and the image on a second display plane.

13. The system of claim 10, wherein the logic is configured to change a pixel value in the display of the image to change the brightness.

14. The system of claim 10, wherein the logic is configured to change a transparency value of the graphics to change the brightness.

15. The system of claim 10, wherein the logic is configured to change the brightness in response to enabling a display review mode.

16. The system of claim 10, wherein the logic is configured to change the brightness in response to receiving a signal corresponding to user input.

17. The system of claim 10, wherein the logic is configured as software in memory.

18. The system of claim 10, wherein the logic includes embedded instructions in a processor.

19. The system of claim 10, wherein the logic includes hardware.

20. The system of claim 10, wherein the display includes a liquid crystal display screen.

21. The system of claim 10, wherein the display includes a graphics user interface that enables a user to select the brightness level of the image.

22. The system of claim 10, wherein the graphics includes text.

23. A system for improving resolution in a display, said system comprising:

means for changing the brightness of a captured image; and means for displaying the changed captured image and graphics overlaid on the changed captured image;

wherein the means for changing includes logic configured to automatically change image pixel data brightness using at least one of a fixed multiplier and a configurable multiplier.

24. The system of claim 23, wherein the means for changing includes logic configured to automatically change image pixel data brightness based on image pixel data brightness values determined from an internally generated histogram as compared to a threshold brightness value.

25. A system for improving resolution in a display, said system comprising:

means for changing the brightness of a captured image; and means for displaying the changed captured image and graphics overlaid on the changed captured image;

wherein the means for changing includes logic configured to automatically change image pixel data brightness based on image pixel data brightness values determined from an internally generated histogram as compared to a threshold brightness value.

* * * * *

UNITED STATES PATENT AND TRADEMARK OFFICE

CERTIFICATE OF CORRECTION

PATENT NO. : 7,505,054 B2
APPLICATION NO. : 10/844066
DATED : March 17, 2009
INVENTOR(S) : Robert D. Thompson It is certified that error appears in the above-identified patent and that said Letters Patent is hereby corrected as shown below:

In column 9, line 20, in Claim 3, delete "first object" and insert -- image --, therefor.

In column 9, line 26, in Claim 5, after "wherein" insert -- the --, therefor.

In column 9, line 43, in Claim 9, delete "claim 1" and insert -- claim 1, --, therefor.

Signed and Sealed this

Eighteenth Day of August, 2009

David J. Kappos

David J. Kappos
*Director of the United States Patent and Trademark Office*